UNITED STATES PATENT OFFICE.

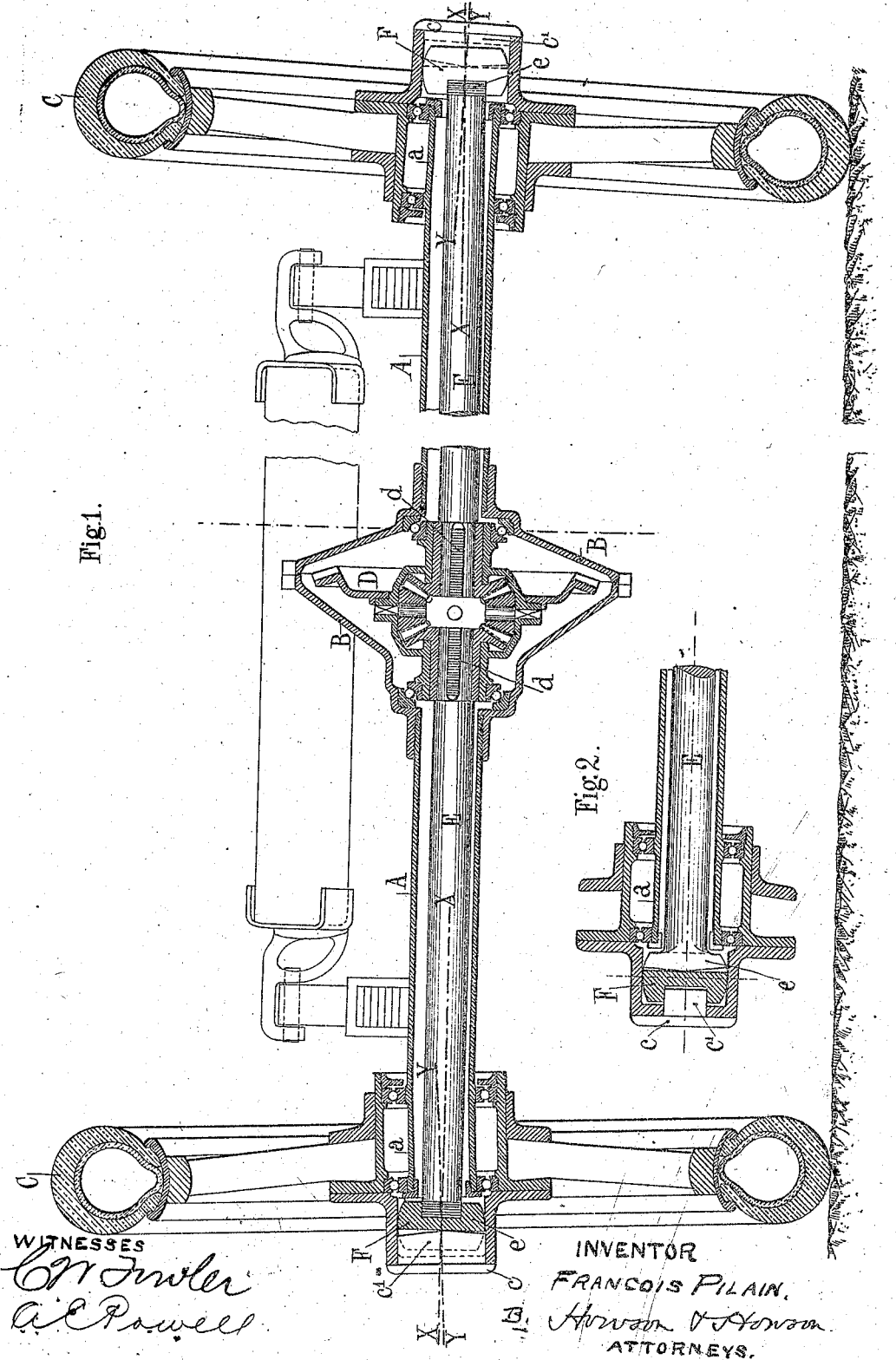

FRANÇOIS PILAIN, OF LYON, FRANCE.

AUTOMOBILE.

No. 815,735. Specification of Letters Patent. Patented March 20, 1906.

Application filed August 15, 1905. Serial No. 274,319.

*To all whom it may concern:*

Be it known that I, FRANÇOIS PILAIN, constructor, a citizen of the French Republic, and a resident of 17 Chemm de Montplaisir, Lyon, France, have invented a certain new and useful Live-Axle for Automobile Vehicles Having Splayed Wheels, of which the following is a full, clear, and exact description, and for which I have applied for Letters Patent in France, dated October 26, 1904, (not issued,) in Great Britain, dated October 28, 1904, No. 23,265, and in Germany October 31, 1904.

This invention relates to a construction of live-axle for automobile vehicles, affording what is termed the "flaring" or "splaying" of the road-wheels—that is to say, allowing these to be mounted in such a manner that the axis passing through the center of the wheel does not coincide with the axis of the axle, but makes therewith a very small angle. In present-day automobile carriages having live-axle drive it is impossible to obtain this splaying because the two parts of the real live-axle which extend from one side and the other of the differential or balance-gear located in the balance-gear box of the latter are journaled or provided with bearings in the cylindrical casing which is fast to the gear-box aforesaid and attached to the springs of the vehicle. This construction renders impossible the obtaining of even a very slight amount of splay, inasmuch as the wheel is fixed to the journaled axle and can only be at right angles thereto. Now it is preferable in order to obtain the utmost efficiency to have splayed road-wheels. My invention enables this splaying to be obtained, and in addition it insures perfect or at least improved conditions of transmission without abnormal binding or friction, such as occurs in ordinary live-axles.

The subsequent description of the invention is given with reference to the accompanying drawings, in which—

Figure 1 shows in longitudinal vertical section a live-axle fitted with flared or splayed wheels according to my invention. Fig. 2 is a part horizontal and longitudinal section.

In the drawings, A indicates a fixed tubular casing or bridge for the axle, and this is formed of two tubes connected by the differential casing B, in which is contained the differential with its bevel crown-wheel engaged by a bevel-pinion driven by a suitable shaft extending from the motor longitudinally of the vehicle, according to the well-known arrangement.

The foregoing arrangement is considered only as an example and as being the one most generally adopted; but the invention is not limited thereto, and the transmission of the engine-power to the differential can be effected by any desired method.

The tubular bridge A is ended at its extremities by two parts *a a*, slightly inclined relatively to the main body A of the bridge in such a manner that the axes Y of these two inclined parts *a* make a small angle with the axis X of the axle. Upon the slanted extremities *a* of the fixed tubular bridge are mounted the road-wheels C by means of plain or ball bearings.

From the differential D, placed in the casing B, proceed the two shafts or parts of the live-axle E E, which extend inside the whole length of the tubular bridge A and exceed it at its extremities without making contact therewith and without the use of bearing-rings. These two parts of the axle E E are connected to the road-wheels C C by means of any suitable joint or articulation device, and this latter may consist of a cardan joint or any other joint arrangement which allows a connection between two axes which are set at an angle.

This device effects the connection between the end *e* of the axle and the outer cap *c* of the hub or nave of the wheel. In the example illustrated the connecting device is composed of a spherical segment F, centered in the cap *c* and having upon its bases two slots or notches at right angles one to the other. With one of these latter there engages the T-shaped head or end *e* of the axle and with the other there engages a web *c'*, belonging to the cap of the wheel-hub. It will therefore be understood that this spherical segment F effects a connection between the horizontal axle E and the road-wheel C of which the axis makes a small angle with this axle. The two parts of the axle are connected to the differential by being simply engaged thereto by means of a pair of keys *d d*. To dismount the parts, it is sufficient to remove the wheel-caps and to draw out the two parts of the axle.

The connection between the live-axle and the road-wheels may be effected by any jointed device which allows power to be transmitted from the horizontal axis of the axle to the road-wheels placed obliquely to said horizontal axis, and in such manner that these road-wheels are driven from their outer caps.

Having thus described my invention, what I claim as such, and desire to secure by Letters Patent, is—

A live-axle having flared or splayed wheels for automobile vehicles, in which the outer tubular body or bridge is slanted or inclined at its two extremities forming two parts which make a slight angle with the main body of the bridge and upon which are mounted the road-wheels, the axes of which are thus slightly oblique relatively to the axis of the axle, the live-axle proper located in the tubular bridge extending horizontally for the whole of the length of the latter to beyond its extremities without making contact with the bridge and without bearing-rings, being connected only at one end to the differential and at the other to the road-wheels, the connection with these latter being effected by means of any suitable jointed device transmitting power from the horizontal axis of the axle to the wheels which are mounted obliquely relatively to the said horizontal axis and in such a manner as to drive the road-wheels through their outer caps.

In testimony whereof I have signed my name to this specification in the presence of two subscribing witnesses.

FRANÇOIS PILAIN.

Witnesses:
THOS. N. BROWNE,
MARIN VACHON.